United States Patent [19]
Hara

[11] Patent Number: 4,795,251
[45] Date of Patent: Jan. 3, 1989

[54] ALBUM TYPE SLIDE SUSPENSION DEVICE

[76] Inventor: Hiroshi Hara, 1-8-2 Hacchobori, Chuo-ku, Tokyo, Japan

[21] Appl. No.: 53,749

[22] Filed: May 22, 1987

[51] Int. Cl.[4] ............................................. G03B 23/08
[52] U.S. Cl. ................................................... 353/120
[58] Field of Search .................... 353/120, DIG. 5; 206/311, 312; 40/152

[56] References Cited

U.S. PATENT DOCUMENTS

| | | | |
|---|---|---|---|
| 1,683,479 | 9/1928 | Nystrom | 206/311 X |
| 2,888,762 | 6/1959 | Wesphal | 353/120 X |

FOREIGN PATENT DOCUMENTS

| | | | |
|---|---|---|---|
| 2449243 | 1/1976 | Fed. Rep. of Germany | 353/120 |
| 43-31382 | 12/1968 | Japan | |
| 47-4101 | 12/1972 | Japan | |

Primary Examiner—Harry N. Haroian
Attorney, Agent, or Firm—Wenderoth, Lind & Ponack

[57] ABSTRACT

There is provided a slide suspension device for use with a projector which generally comprises an album body including first and second album body portions movable towards and away from each other, a suspension bar fixedly secured to the first album body portion, at least one hanger removably suspended from the suspension bar and a plurality of slide cases hung from the hanger.

7 Claims, 4 Drawing Sheets

ALBUM TYPE SLIDE SUSPENSION DEVICE

BACKGROUND OF THE INVENTION

This invention relates to a slide suspension device for use with a projector and more particularly, to an album type slide suspension device in which a plurality of slide cases each receiving framed slides in spaced relationship are received in an album body in rows extending parallel to the plane of the album body and right angles to the album body planes.

PRIOR ARTS

Generally, framed slides received in holders are carried by lecturers to a publication or explanation meeting. One of the prior art framed slide holders is shown in Japanese Patent Application Publication No. 4101/1972, for example. The framed slide holder disclosed in the Japanese patent application comprises an outer paper frame member A and a paper core member B nested in the outer frame member B and having a plurality of partitions 3 which define flat chambers having openings 6 defined between adjacent partitions 3 for releasably receiving slides C.

However, the slide holder of the Japanese patent application is adapted to be loaded with slides in the chambers in a predetermined numeral order by the lecturer or his attendant and the slide holder is temporarily placed in an usher's custody at the place of an explanation meeting. The prior art slide holder has the drawbacks that it is a time consuming operation to place the slides into the slide holder in the predetermined explanation order and very inconvenient to carry the slide holder about.

Another prior art slide holder or case is prepared by forming ten seeing windows in an elongated thick paper board in a spaced relationship in the longitudinal direction of the board with partitions interposed between adjacent windows so that each window receives one framed slide therein. However, since the slide case receives ten framed slides arranged in a row in the longitudinal direction of the slide case, after the projection of the slides in an explanation meeting, the slide case cannot be filed in an album and the like or placed in storage after the explanation meeting, it is the practice that the framed slides are taken out of the slide case and the case is then discarded or thrown away. Thus, the prior art slide case is uneconomic.

A prior art slide film filing device for use with a slide projector is shown in Japanese Utility Model Application Publication No. 31382/1968. The device shown in the Japanese utility model application comprises a base or support board and a plurality of filing units adhered to one surface of the base board in an inverted louver arrangement. Each of the filing units comprises an inner translucent synthetic resin layer adhered to the base board and an outer transparent synthetic resin layer adhered at the lower and opposite side edges to the inner layer and including a plurality of open top compartments defined by a plurality of vertical partitions so as to receive one slide film on a frame in each of the compartments with an upper portion of the film frame projecting beyond the open top of the associated compartment for easy removal of the framed slide out of the compartment.

However, the prior art slide film filing device has the drawback that when the framed slide films are to be projected by a projector, the framed slide films are in succession taken out of the associated compartments, arranged in a slide case in a predetermined order and then projected by the projector and after the projection, the framed slide films are taken out of the slide case and returned to the designated compartments whereby the handling operation of the slide films is inevitably tedious and time consuming. The prior art slide film filing device further has the drawback that when the filing device is tilted or turned upside down, since the framed slide films tend to fling out of their compartments, they have to be rearranged in the predetermined proper order and returned to their designated compartments wasting time.

Thus, the prior art devices are not so designed that a slide case with framed slides received therein can be easily donned on and doffed from a filing device and is not provided with a means for preventing the framed slides from flinging out of their receiving compartments in the slide case and a means for permanently preserving the slide case itself.

SUMMARY OF THE INVENTION

Therefore, the present invention has its object to provide an album type slide suspension device for use with a slide projector which can effectively eliminate the drawbacks inherent in the prior art devices referred to hereinabove and allows slides cases to be simply and positively donned on and doffed from an album body and also to be preserved in the album body in a stabilized position. In addition, even when the slide case or cases hung on the hangers tilt, the slide case or cases abut against a portion of the album body so that the tilting movement of the slide case or cases are arrested by the album body portion whereby the slide case or cases can be positively prevented from disengaging from the hanger or hangers. Furthermore, since the slide cases are rotatable relative to their associated hangers, the slide cases can be easily and simply donned on and doffed from their hangers and when one slide case is doffed from its associated hanger or rotated relative to the hanger, the framed slides received in the slide case adjacent to the rotated or doffed slide case can be easily seen.

The album type slide suspension device of the present invention generally comprises an album body including first and second album body portions interconnected together by means of an intermediate album body portion for movement towards and away from each other, a suspension bar fixedly secured to the first album body portion and extending transversely of the first album body portion, at least one hanger supported on the suspension bar and having a plurality of spaced resilient flaps depending downwardly from the hanger and a slide case hung from the hanger. The suspension bar has a substantially U-shaped cross-section opening downwardly, the first album body portion has a plurality of laterally spaced stub-shafts extending at right angles thereto towards the second album body portion and the second album body portion is provided with holes for receiving the stub-shafts on the first album body portion.

The hanger comprises an elongated support frame having laterally spaced through holes for receiving the stub-shafts on the first album body portion and integrally including a plurality of laterally spaced resilient flaps extending downwardly from the support frame each supporting a slide case having a plurality of slides received therein. The slide case to be hung from the hanger is formed at one or the upper end with an engaging slot open at one and closed at the other end a plurality of spaced seeing windows in the front of the slide case to thereby attain the above-mentioned object of the present invention.

Thus, according to the present invention, when the album type slide suspension device is carried by a lecturer to the place of an explanation meeting, a desired or selected slide case is disengaged from the associated flap and the slide case having the slides received therein is placed into the projector, the slides can be projected while being held in the slide case without removing the slides out of the slide case. And after the projection of the slides in the first slide case has been completed, when the slide case is rotated relative to the associated flap, the slides in the slide case adjacent to the first slide case can be seen.

According to the present invention, there is provided an album-type slide suspension device which generally comprises an album body including first and second album body portions movable towards and away from each other, a horizontal suspension bar fixedly secured to the inner surface of said album first body portion and extending transversely of the album first body portion, a plurality of hangers suspended from said suspension bar in spaced side by side relationship in the longitudinal direction of the suspension bar and a plurality of slide cases hung from each of said hangers each receiving a plurality of framed slides in vertically spaced relationship.

The above and other objects and attendant advantages of the present invention will be more readily apparent to those skilled in the art from a reading of the following detailed description in conjunction with the accompanying drawings which show one preferred embodiment of the invention for illustration purpose only, but not for limiting the scope of the same in any way.

PREFERRED EMBODIMENT OF THE INVENTION

Figure 1:
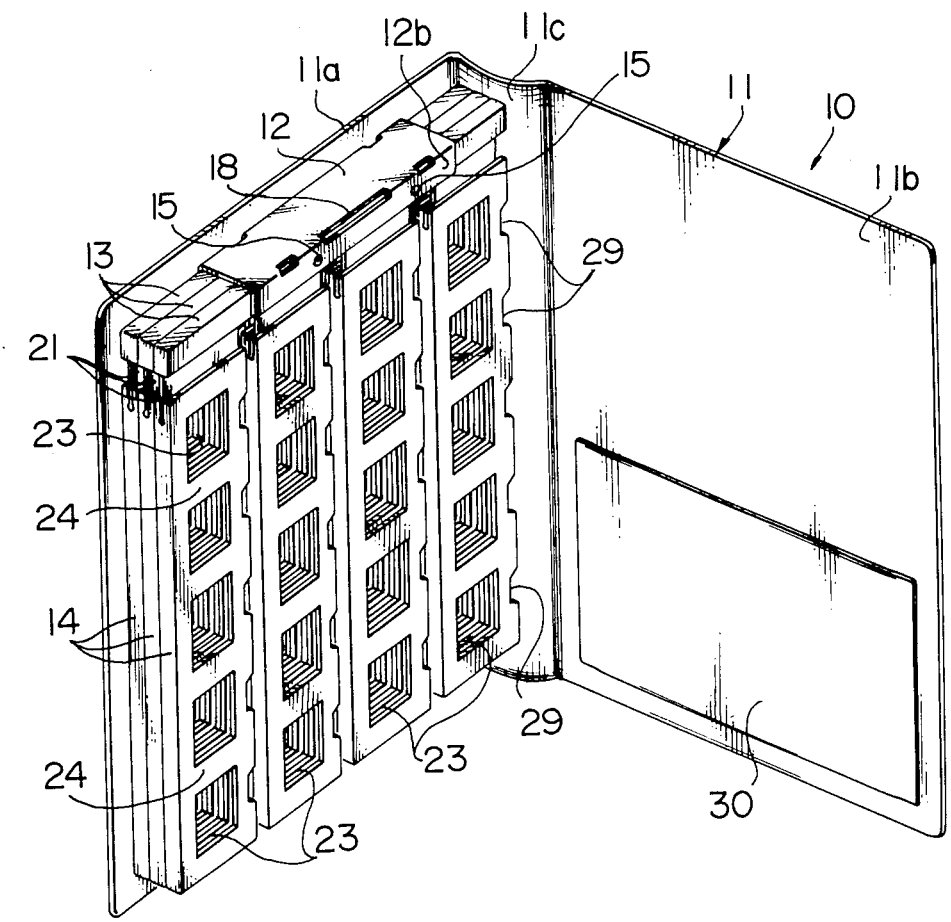
FIG. 1 is a perspective elevational view of the preferred embodiment of the album type slide suspension device for use with a slide projection constructed in accordance with the principle of the present invention showing the album body in its opened position.
Figure 2:
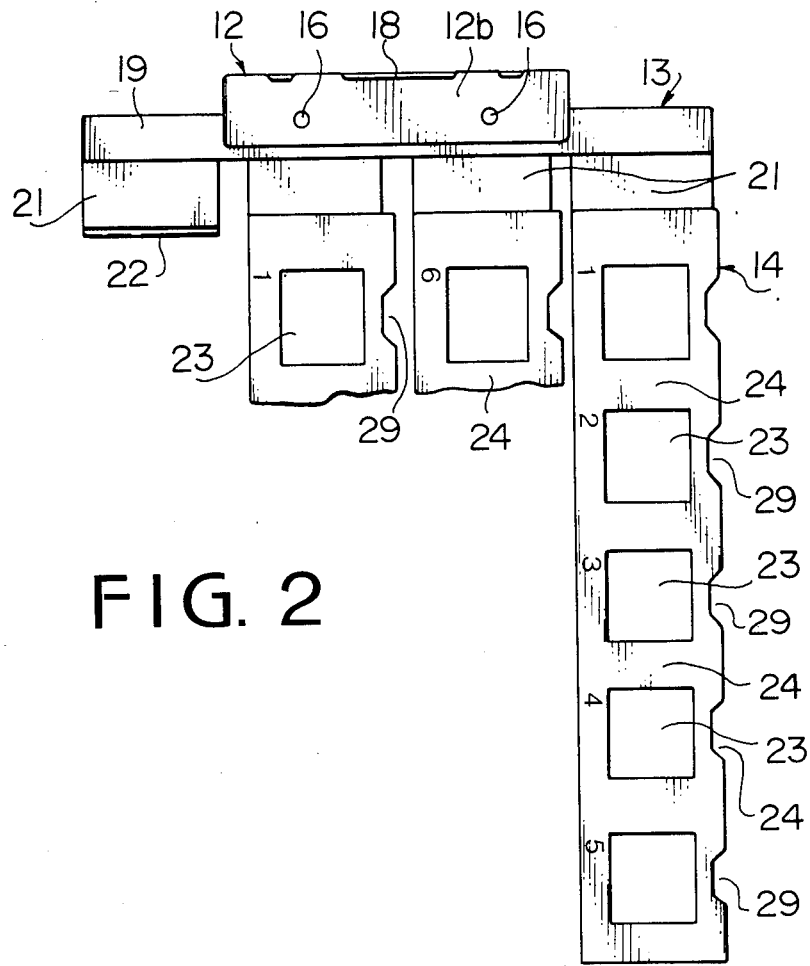
FIG. 2 is a front elevational view showing the engaging relationship between the slide hanger and slide cases with a portion thereof broken away.

The present invention will be now described referring to the accompanying drawings in which one preferred embodiment of the album type slide suspension device for use with a slide projector constructed in accordance with the principle of the invention is shown for illustration purpose only, but not for limiting the scope of the same in any way. First, referring to FIG. 1 of the drawings, the slide suspension device is generally shown by reference numeral 10 and generally comprises a unitary erect album body 11, a horizontal suspension bar 12 fixedly secured to and extending along the upper end of the album body 11, a plurality of horizontal hangers 13, suspended from the suspension bar 12 and extending in side by side relationship to each other in planes parallel to the plane of the album body and a plurality of slide cases 14 each detachably engaging on and suspended from the associated hanger 13.

As more clearly shown in FIG. 1, the unitary album body 11 comprises a first album body portion 11a, a second album body portion 11b and a third or intermediate album body portion 11c. The junction between the first and intermediate album body portions 11a, 11c and the junction between the second and third album body portions 11b, 11c are reduced in thickness so that the first and second album body portions are allowed to move towards and away from each other resulting in closing and opening of the album body 11.

Figure 3:
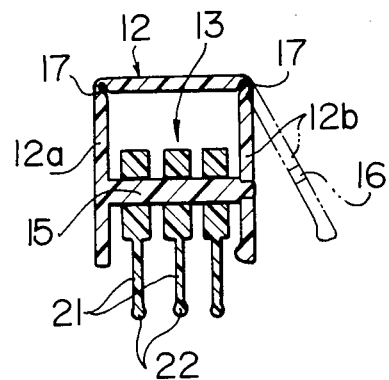
FIG. 3 is a cross-sectional view showing the engaging relationship between the slide hanger and slide cases as shown in FIG. 2.

The suspension bar 12 is formed of synthetic resin and has a substantially U-shaped cross-section opening downwardly. As more clearly shown in FIG. 4, the suspension bar 12 includes a first or fixed leg portion 12a fixedly secured to the inner surface of an upper end portion of the album body portion 11a, a second or movable leg portion 12b and an intermediate top portion 12c connected at the opposite side edges to the first and second leg portions 12a, 12b. The first leg portion 12a is provided on the inner surface thereof with a plurality of spaced stub-shafts 15 (two stub-shafts in the illustrated embodiment) which extend horizontally towards the second leg portion 12b and the second leg portion 12b is provided with a plurality of through holes 16 which correspond to the stub-shafts 15 with respect to number and position for receiving the stub-shafts 15. As shown in FIG. 3, the inner surface of the suspension bar 12 is provided with notches 17 at the junction between the first leg portion 12a and intermediate leg portion 12c and at the junction between the second leg portion 12b and intermediate leg portion 12c so that the suspension bar 12 can be easily bent. A portion of each of the notches 17 is formed with a through opening 18 which accelerates the bending of the suspension bar 12.

Figure 4:
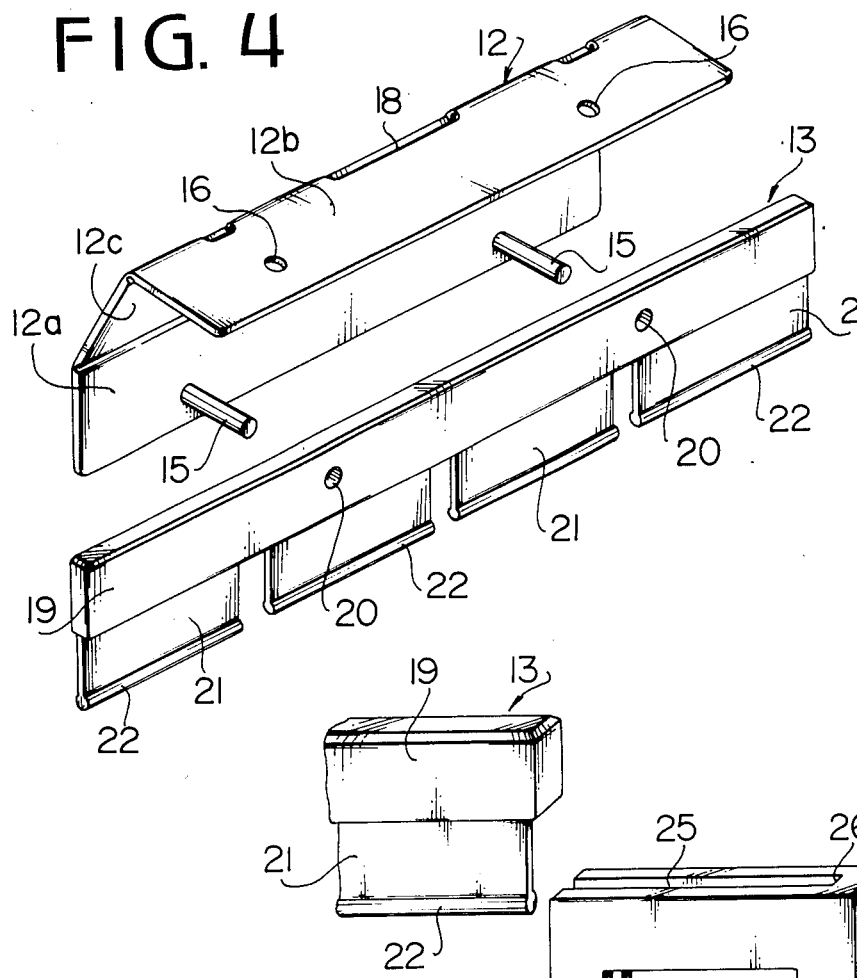
FIG. 4 is an exploded perspective view of the suspension bar and slide hanger.

As more clearly shown in FIG. 4, each of the hangers 13 formed of synthetic resin comprises a rectangular support frame 19 extending in the longitudinal direction of the hanger and provided with spaced through holes 20, 20 for receiving the stub-shafts 15 on the suspension bar portion 12a. Extending downwardly from the support frame 19 are a plurality of laterally spaced depending resilient flaps 21. Each of the depending flaps 21 is integrally formed at the lower edge thereof with an anchoring bulge 22 the function of which will be described hereinafter.

Figure 5:
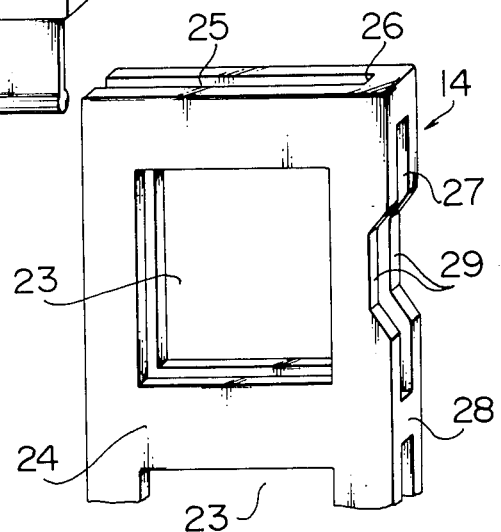
FIG. 5 is an exploded perspective view of the slide hanger and its associated slide case with a portion thereof broken away.
Figure 6:
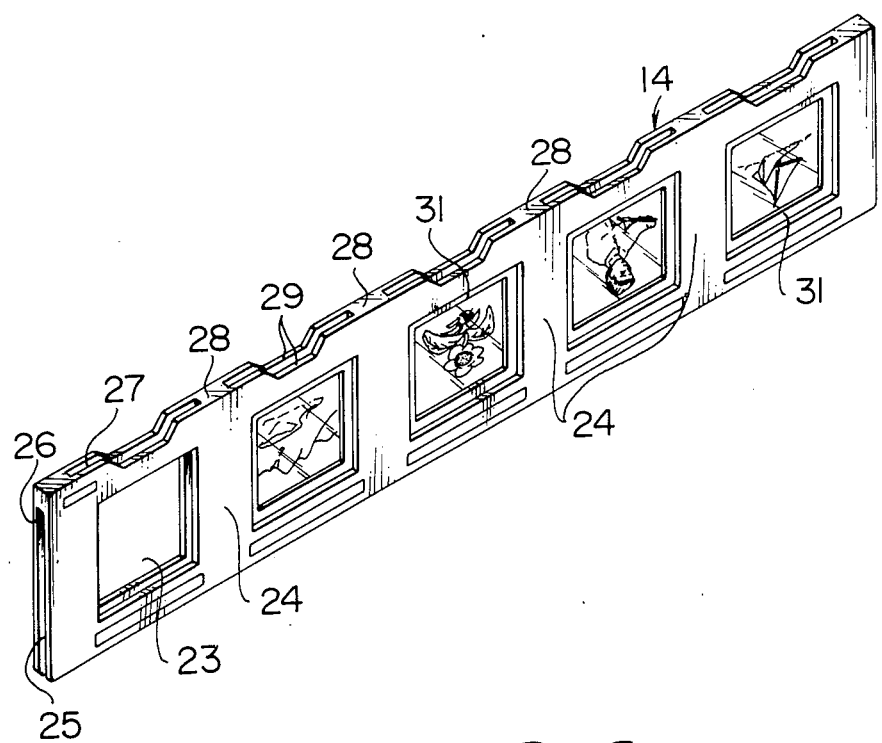
FIG. 6 is a perspective view of one slide case having a plurality of slides received therein.

As more clearly shown in FIG. 5, each of the slide cases 14 formed of synthetic resin is adapted to be detachably engaged at the upper end on the bulge 22 on the associated depending flap 21. The slide case 14 is formed in the front surface with a plurality of spaced seeing windows 23 which are defined by a plurality partition walls 24. The slide case 14 is further provided at the upper end face thereof with an elongated engaging slot 25 for engaging on the bulge 22 on the associated depending flap 21. The slot 25 is open at one end and closed at other end at 26 so that the slide case 14 is prevented from accidentally disengaging itself from the associated depending flap 21. The slide case 14 is further provided on side edge with a plurality of spaced access openings 27 through each of which a slide is inserted into and taken out of the slide case 14. The access openings 27 are defined by a plurality of spaced partitions 28 and each two notches 29 are formed on the above-mentioned one side edge of the slide case 14 on the opposite sides of each access opening 27. Reference numeral 30 denotes a pocket provided on the inner surface of the album second portion 11b and formed of a transparent sheet for receiving a memorandum or the like.

With the above-mentioned construction and arrangement of the components of the album type slide suspension device for use with a slide projector according to the present invention, in use, framed slides 31 are inserted into one slide case 14 through the respectively designated access openings 27. The slide case 14 having the framed slides 31 received therein is then hung on the associated depending flap 21 of the hanger 13 by sliding the slot 25 in the slide case 14 along the bulge 22 on the depending flap 21 until the closed end 26 of the slot 25 abuts against the bulge 22 whereupon the slide case 14 is anchored to the depending flap 21. In a separate operation, the through openings 20 in the hanger 13 are engaged on the stub-shafts 15 on the suspension bar 13 and the openings 16 in the second suspension bar leg portion 12b are then engaged on the stub shafts 15 on the first suspension bar leg portion 12a to prevent the hanger 13 from disengaging from the suspension bar 12 to thereby positively support the slide case 14 in the position as shown in FIG. 1. By repeating the same procedure, a plurality of slide cases 14 are preserved in the slide suspension device in rows extending parallel to the plane of the first album portion 11a and at right angles to the said plane of the album portion. Thus, when selected framed slides are to be projected by the projector (not shown), the slide case 14 having the selected slides received therein is removed from the associated depending flap 21 by sliding the slot 25 off the bulge 22 on the depending flap 21 and the slides 31 are projected by the projector with the slides 31 held in the slide case 14. On the other hand, when it is desired to project framed slides in the slide case 14 underlying a particular slide case 14, the depending flap 21 associated with the overlying slide case 14 is resiliently flexed away from the flap 21 associated with the underlying slide case 14 by such a distance that the underlying slide case 14 can be easily disengaged from the associated flap 21 by sliding the case along the bulge 22 on the flap following the same procedure as described hereinabove in connection with the removal of the overlying slide case 14 whereby the slides 31 can be projected by a projector without being taken out of the slide case 14. And when the positions of the overlying and underlying slide cases 14 are desired to be replaced therebetween, the second album body portion 12b is slided off the stub-shafts 15 by means of the through holes 16 in the second album portion 12b so that the second album body portion 12b can be moved away from the first album body portion 12a and the overlying and underlying slide cases 14 are then disengaged from their associated flaps 21 in the manner as described hereinabove. Thereafter, the previously overlaid slide case 14 is engaged on the flap 21 associated with the previously underlaid slide case 14 and the previously underlaid slide case 14 is engaged on the flap 21 associated with the previously overlaid slide case 14.

Since the slide cases 14 are movably hung from their respectively associated hangers 13, the images on the framed slides 31 received in their slide cases 14 can be easily identified.

As clear from the foregoing description on the preferred embodiment of the present invention, the slide suspension device of the present invention, has the advantages that the slide cases having the framed slides received therein can be detachably hung from the hangers in the device in a plurality of rows extending in directions parallel to the plane of the first album body portion and right angles to the first album body portion plane, that in use of the framed slides, the framed slides can be projected by a projector without being taken out of their slide cases and that after the projection of the slides, the slides in their slide cases can be preserved in the rows in the album body. Since the suspension bar fixedly secured to the first album body portion has an inverted U-shaped cross-section opening downwardly and the second album body portion is releasably engaged on the stub-shafts of the first album body portion, the positions of the slide cases can be easily replaced therebetween so that the images of the slides can be identified as desired or selected. Since the hanger or support frame has a plurality of resilient flaps provided at the lower edges with the bulges extending downwardly in laterally spaced relationship and the slide cases are releasably engaged on the bulges, the slides received in the successively underlying slide cases can be easily identified by resiliently flexing the resilient flaps associated with the successively overlying slide cases and desired slides can be taken out of the device without being removed from their slide cases. Since the resilient flaps are positioned in laterally spaced relationship, the slide cases can be easily engaged on and disengaged from the flaps by the utilization of the spaces provided between adjacent flaps and by increasing or reducing the number of the support frames, the number of slide cases to be preserved in the album body can be increased or reduced as desired.

Furthermore, since the slide case having a plurality of seeing windows therein is provided at one end face with a slot opening at one end and closed at the other end for engaging on the bulges on the associated flap, the slide case can be positively engaged on the associated flap and precisely positioned on the flap by the abutment of the closed end of the slot against the flap whereby the slide case can be prevented from accidentally disengaging from the flap.

I have shown and described as my invention a single embodiment of the slide suspension device for use with a projector. However, it is to be understood that the embodiment herein disclosed is merely illustrative of the novel features embodied in my invention, and that the same is not to be limited thereto, but is to be afforded the full scope of the appended claims.

What is claimed is:

1. An album type slide suspension device for use with a slide projector comprising:
   an album body including first and second album body portions movable towards and away from each other;
   a horizontal suspension bar fixedly secured to the inner surface of said album first body portion and extending transversely of said album first body portion;
   a plurality of hangers suspended from said suspension bar in spaced side by said relationship in the longitudinal direction of the suspension bar, each of said hangers including a plurality of laterally spaced resilient flaps depending from the hanger, and each of said resilient flaps having anchoring bulges at the lower edges thereof; and a plurality of slide cases hung from each of said anchoring bulges of said hangers for receiving a plurality of framed slides in vertically spaced relationship.

2. An album type slide suspension device for use with a slide projector comprising:

an album body including first and second album body portions movable towards and away from each other;

a horizontal suspension bar fixedly secured to the inner surface of said album first body portion and extending transversely of said album first body portion, said suspension bar having a substantially U-shaped cross-section opening downwardly including a first leg portion fixedly secured to said album first body portion, a second leg portion movable relative to said first leg portion, and an intermediate top portion interconnecting said first and second leg portions, the inner surface of said suspension bar having notches at the junctions between said first leg portion and intermediate top portion and between said second leg portion and intermediate top portion, and said notches having through openings;

a plurality of hangers suspended from said suspension bar in spaced side relationship in the longitudinal direction of the suspension bar; and a plurality of slide cases hung from each of said hangers for receiving a plurality of framed slides in vertically spaced relationship.

3. An album type slide suspension device for use with a slide projector comprising:

an album body including first and second album body portions movable towards and away from each other;

a horizontal suspension bar fixedly secured to the inner surface of said album first body portion and extending transversely of said album first body portion, said suspension bar having a substantially U-shaped cross-section opening downwardly including a first leg portion fixedly secured to said album first body portion, a second leg portion movable relative to said first leg portion, and an intermediate top portion interconnecting said first and second leg portions, said first leg portion having a plurality of laterally spaced stub-shafts extending towards said second leg portion, and said second leg portion having through holes for receiving said stub-shafts, said second leg portion being movable along the stub-shafts towards and away from said first leg portion, the inner surface of said suspension bar having notches at the junctions between said first leg portion and intermediate top portion and between said second leg portion and intermediate top portion, and said notches having through openings;

a plurality of hangers suspended from said suspension bar in spaced side by side relationship in the longitudinal direction of said suspension bar; and a plurality of slide cases hung from each of said hangers for receiving a plurality of framed slides in vertically spaced relationship.

4. The album type slide suspension device as set forth in claim 1 wherein each of said slide cases is provided at the upper end face with a slot open at one end and closed at the other end for releasably engaging on said bulge at the lower edge of the resilient flap.

5. The album type slide suspension device as set forth in claim 1 wherein said slide cases are suspended from said hangers in rows extending parallel to the plane of said album first body portion and right angles to said plane of the album first body portion.

6. The album type slide suspension device as set forth in claim 3 wherein each of said hangers is provided with through holes for receiving said stub-shafts on the suspension bar first leg portion.

7. An album type slide suspension device comprising:

an album body including first and second album body portions movable towards and away from each other and an intermediate album body portion interconnecting said first and second album body portions;

a horizontal suspension bar fixedly secured to the inner surface of said album first body portion and extending transversely of the album first body portion, said suspension bar having a substantially U-shaped cross-section opening downwardly including a first leg portion fixedly secured to said body portion and having stub-shafts extending inwardly, a second leg portion movable towards and away from said first leg portion and having through holes for receiving said stub-shafts and an intermediate top portion interconnecting said first and second leg portions;

a plurality of hangers suspended from said suspension bar in spaced side by side relationship in the longitudinal direction of the suspension bar, each of said hangers having spaced through holes for receiving said stub-shafts on the suspension bar first leg portion and a plurality of laterally spaced resilient flaps depending from the hanger and provided at the lower edges with bulges; and a plurality of slide cases hung from said resilient flaps, each of said slide cases having at the upper end face a slot open at one end and closed at the other end for engaging on the bulge on the resilient flap.

* * * * *